United States Patent
Hiddink et al.

(10) Patent No.: US 7,515,913 B2
(45) Date of Patent: Apr. 7, 2009

(54) METHOD AND APPARATUS FOR AUTOMATIC CHANGE OF AN OPERATING CHANNEL IN A WIRELESS COMMUNICATION SYSTEM

(75) Inventors: Gerrit Willem Hiddink, Utrecht (NL); Amiram Levi, Hilversum (NL); Harald Van Kampen, Utrecht (NL); Martinus Cornelis Wezelenburg, Tiel (NL)

(73) Assignee: Agere Systems Inc., Allentown, PA (US)

( * ) Notice: Subject to any disclaimer, the term of this patent is extended or adjusted under 35 U.S.C. 154(b) by 715 days.

(21) Appl. No.: 10/999,162

(22) Filed: Nov. 29, 2004

(65) Prior Publication Data
US 2005/0227624 A1   Oct. 13, 2005

Related U.S. Application Data

(60) Provisional application No. 60/557,322, filed on Mar. 29, 2004.

(51) Int. Cl.
*H04Q 7/20* (2006.01)

(52) U.S. Cl. ............. 455/453; 455/161.2; 455/179.1; 455/185.1; 455/445; 455/455; 455/509; 709/225

(58) Field of Classification Search .......... 455/453, 455/161.2, 179.1, 185.1, 186.1, 445, 512, 455/513, 452.1, 509, 455; 709/225, 248
See application file for complete search history.

(56) References Cited

U.S. PATENT DOCUMENTS

| | | | |
|---|---|---|---|
| 3,979,680 A | * | 9/1976 | Sakamoto ............... 455/186.1 |
| 6,223,043 B1 | * | 4/2001 | Hazama ................... 455/455 |
| 7,206,840 B2 | * | 4/2007 | Choi et al. ................ 709/225 |

\* cited by examiner

*Primary Examiner*—Matthew D Anderson
*Assistant Examiner*—Shaima Q Aminzay
(74) *Attorney, Agent, or Firm*—Ryan, Mason & Lewis, LLP

(57) ABSTRACT

Methods and apparatus are disclosed for automatically detecting when an operating channel needs to be changed in a wireless communication system. An alternate channel is selected by obtaining information about a plurality of available channels; assigning a score to each available channel; and selecting an alternate channel from the available channels based on the assigned score. The state of the selected alternate channel and the current channel are compared. A change to the selected alternate channel is initiated when one or more predefined criteria are satisfied.

27 Claims, 4 Drawing Sheets

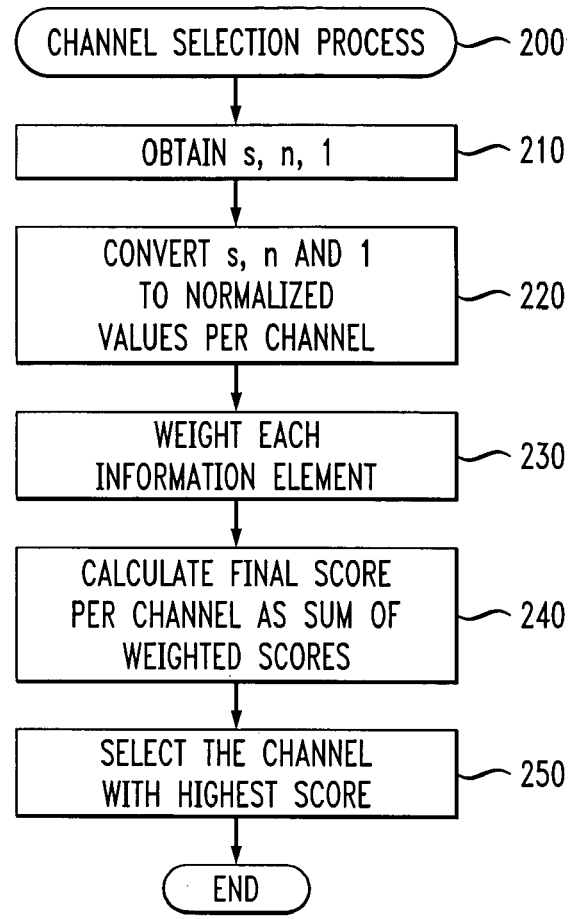

| INFORMATION ELEMENT | SYMBOL | VALUE | THRESHOLD | NORMALIZED |
|---|---|---|---|---|
| CHANNEL 1 | | | | |
| NUMBER OF STATIONS | $I_{1,s}$ | 3 | | 0.012 |
| NOISE LEVEL (dB) | $I_{1,n}$ | -80 | | 0.2 |
| CHANNEL LOAD (%) | $I_{1,1}$ | 70 | diff = 20% | 0.3 |
| CHANNEL 2 | | | | |
| NUMBER OF STATIONS | $I_{2,s}$ | 2 | | 0.008 |
| NOISE LEVEL (dB) | $I_{2,n}$ | -90 | | 0.4 |
| CHANNEL LOAD (%) | $I_{2,1}$ | 90 | diff = 20% | 0.1 |

METHOD AND APPARATUS FOR AUTOMATIC CHANGE OF AN OPERATING CHANNEL IN A WIRELESS COMMUNICATION SYSTEM

CROSS REFERENCE TO RELATED APPLICATION

This application claims the benefit of U.S. Provisional Application No. 60/557,322, filed Mar. 29, 2004, incorporated by reference herein.

FIELD OF THE INVENTION

The present invention relates generally to wireless communication systems, such as wireless local area networks (LANs), and more particularly, to channel selection techniques in such wireless communication systems.

BACKGROUND OF THE INVENTION

Wireless communication systems are inherently subject to radio interference. The interference may come from a number of sources, including, for example, (i) radio systems operating on nearby frequencies that 'leak' energy into the operating channel; (ii) radio systems operating on the same frequency with an unknown access pattern or a modulation that cannot be understood, such as a cordless telephone; (iii) devices that emit radio frequency (RF) energy as a side effect, such as personal computers and certain types of lighting; (iv) devices that emit radio frequency (RF) by design, but are not capable of negotiating to share the channel or follow a channel access protocol, such as microwave ovens and radar systems; and (v) radio systems that are capable of negotiating to share a radio channel but consume too large a portion of the available channel capacity.

Wireless communication devices are often configured to operate on a fixed radio channel. In other implementations, a user's interaction may be required to notify the device that there is too much interference and that a jump to a different channel is desired. Often, this causes a perceivable interruption of the communication service. For example, in the presence of too much interference in an audio communication system, a user may detect a noise, such as a click, or the sudden absence of sound. Similarly, in a video communication system, a user may detect jerky movements or otherwise distorted images. For a data communication system, however, the interruption in communication service is generally less noticeable because the data transfer is typically less time-critical.

A need therefore exists for methods and apparatus that can automatically detect when an operating channel needs to be changed in a wireless communication system. A further need exists for methods and apparatus for automatically determining when to change the operating channel and automatically selecting a new operating channel. Yet another need exists for methods and apparatus that can automatically change an operating channel, while minimizing the time that the communication service is disrupted so that the channel jump has minimal perceivable effects to the user.

SUMMARY OF THE INVENTION

Generally, methods and apparatus are disclosed for automatically detecting when an operating channel needs to be changed in a wireless communication system. An alternate channel is selected by obtaining information about a plurality of available channels; assigning a score to each available channel; and selecting an alternate channel from the available channels based on the assigned score. For example, the evaluated information may include the number of other devices on each available channel; a noise level on each available channel; a channel load on each available channel or a combination of the foregoing.

The state, such as system state information, of the selected alternate channel and the current channel are compared. A change to the selected alternate channel is initiated when one or more predefined criteria are satisfied. In the event of a channel change, a message is sent to at least one other device to notify the other device of the selected alternate channel.

A more complete understanding of the present invention, as well as further features and advantages of the present invention, will be obtained by reference to the following detailed description and drawings.

BRIEF DESCRIPTION OF THE DRAWINGS

FIG. 2 is a flow chart describing an exemplary implementation of a channel selection process that may be implemented by the channel selection module of FIG. 1;

FIG. 3 is an exemplary table that records the exemplary information elements that are processed by the channel selection process of FIG. 2, and corresponding exemplary assigned weights, priorities, and thresholds for each information element;

DETAILED DESCRIPTION

The present invention provides methods and apparatus for automatic changes of a selected operating channel in a wireless communication system. The present invention automatically reconfigures the operating channel of a wireless communications system, such as a multimedia communication system, with particular attention to minimizing the disruption of the communication service to thereby reduce the perceptual impact of the channel change.

Figure 1:
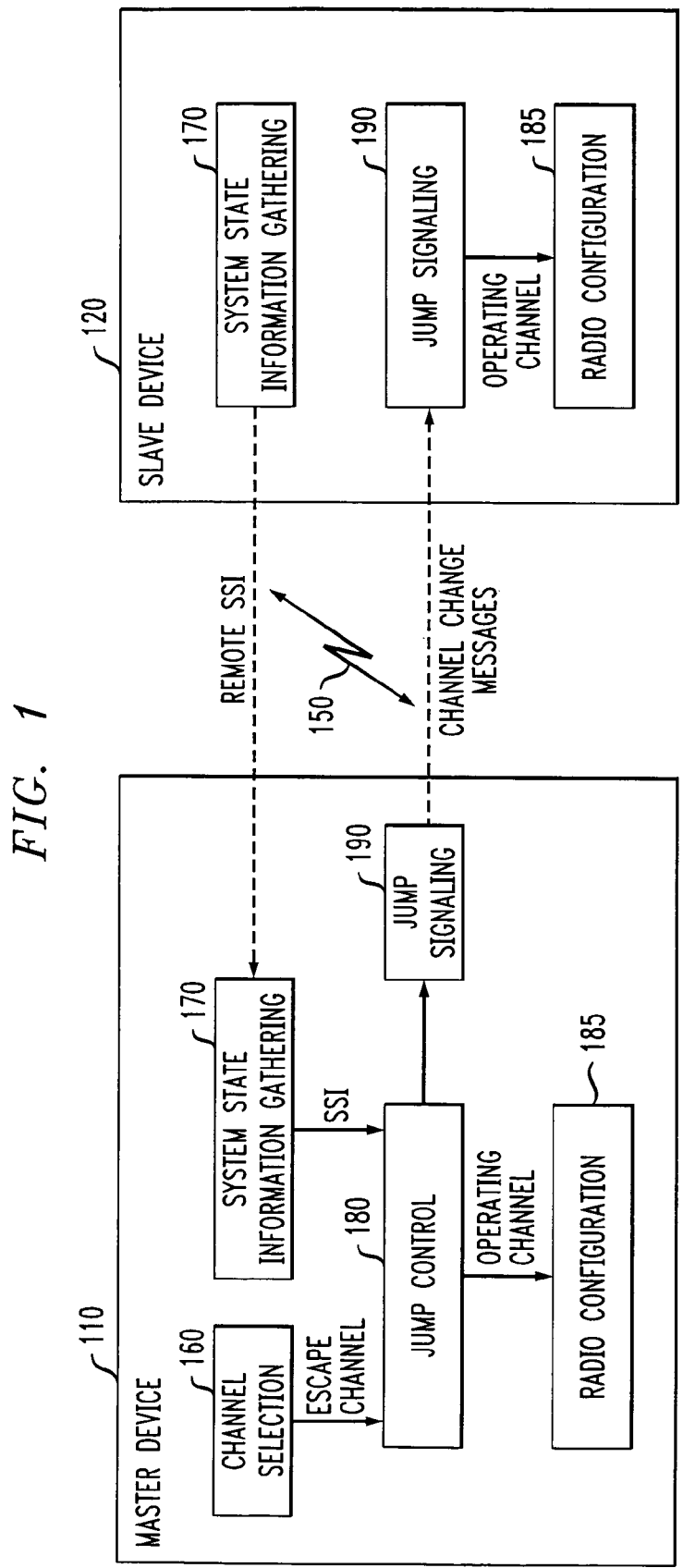
FIG. 1 illustrates two exemplary devices communicating over a wireless link in accordance with the present invention.

FIG. 1 illustrates two exemplary devices 110, 120 communicating over a wireless link 150. It is assumed that one of the communication devices 110, 120 is designated as a master device that selects the best channel and initiates the channel change. The other devices 120 (only one such device 120 is shown in FIG. 1, for ease of illustration) are slave devices that listen for the notification from the master device 110 to change the operating channel. In the exemplary embodiment of FIG. 1, the device 110 is acting as the master device and the device 120 is acting as the slave device, in the sense that the master device 110 controls the selection of the operating channel for the current communication. While only one slave device 120 is shown in FIG. 1, it is noted that a number of slave devices 120 may participate in a given communication, as would be apparent to a person of ordinary skill in the art. As shown in FIG. 1, and discussed further below, the master device 110 incorporates a channel selection module 160, a system state information gathering module 170, a jump control module 180 and a jump signaling module 190. The slave device 120 generally only needs to incorporate the system state information gathering module 170 and the jump signaling module 190. In an implementation where only the master device 110 collects the system state information, the slave device does not require a system state information gathering module 170.

Generally, as discussed below in conjunction with FIG. 2, the channel selection module 160 selects a new operating channel, e.g., the next best operating channel that is available to the system. The system state information (SSI) module 170 gathers information about the current state of the communication system, such as buffer state information, transmission delay characteristics, error rate characteristics, etcetera. The SSI module 170 can gather this information locally, in the communication device it is incorporated in, or remotely, extracting system state information from other communication devices.

Finally, as discussed below in conjunction with FIG. 5, the jump control module 180 combines the SSI information into a decision algorithm, and decides when to change to a new operating channel. When the jump control module 180 determines that the operating channel should be changed, the jump control module 180 will send a signal to the jump signaling module 190. The jump signaling module 190 will coordinate the channel change between the master device 110 and any slave devices 120 active in the wireless communication network, referred to herein as The "communication network." The jump signaling module 190 informs the slave devices 120 of when to change the operating channel and the selected operating channel.

The radio configuration module 185 allows the devices 110, 120 to modify the configuration of the radio subsystem, in a known manner. As shown in FIG. 1 and discussed further below, the jump control module 180 provides the selected operating channel to the radio configuration module 185 and the radio configuration module 185 modifies the configuration of the radio subsystem to select the new operating channel, in a known manner.

Channel Selection Module 160

The channel selection module 160 selects the next-best operating channel. In one embodiment, the channel selection module 160 has its own radio subsystem that allows the channel selection module 160 to examine other operating channels without disturbing the media (or data) transmission that the system is actively participating in. A dual radio system is more expensive than a single radio system. Thus, a secondary solution is to allow the master device 110 to signal to all slave devices 120 that the master device 10 is temporarily unavailable for communication, and the master device 110 re-programs the radio subsystem for other channels to investigate the channel conditions. The period that the master device 110 is evaluating the channel conditions must be sufficiently short to cause minimal perceivable interruption in the media communication service.

The channel selection module 160 may use whatever information the particular radio communications protocol provides, such as the number of other devices on the channel, the amount of data being exchanged, the type of other devices on the channel and the presence of radar. For example, in an exemplary IEEE 802.11 protocol and the various extensions thereof, described, for example, in IEEE, "802.11, Wireless LAN Medium Access Control (MAC) and Physical Layer (PHY) Specifications," November 1997, the Access Point of a network sends out beacons that may include the channel load (as per the IEEE 802.11e extensions) and radio resource information (as per the IEEE 802.11k extensions). This allows the channel selection module 160 to (1) count the number of other networks; (2) obtain information on the channel load; and (3) obtain information on the radio channel as perceived by the other nodes in the network.

The channel selection module 160 analyzes this information in order to select the best alternative operating channel. FIG. 2 is a flow chart describing an exemplary implementation of a channel selection process 200 that may be implemented by the channel selection module 160 of FIG. 1. As shown in FIG. 2, the channel selection process 200 initially obtains, during step 210, the number of other stations on the channel, s, the noise level on the channel, n, and the channel load as perceived by the other stations, l. Thereafter, the channel selection process 200 converts the collected information (s, n and l) to normalized values per channel during step 220.

The channel selection process 200 adds weights to each information element during step 230 to arrive at a weighted score for each information element and sums these weighted scores during step 240 to arrive at a final score per channel. Finally, during step 250, the channel selection process 200 selects the channel with the highest score as the "best" channel.

FIG. 3 is an exemplary table 300 that records the exemplary information elements in field 310 that are processed by the channel selection process 200 of FIG. 2, and the corresponding exemplary assigned weights, priorities, and thresholds for each information element in fields 320, 330 and 340, respectively. The weights in field 320 are used during step 230 to determine a weighted score. The priority in field 330 identifies the order in which these information elements should be evaluated when selecting an operating channel, as discussed further below.

Figures 4, 5:
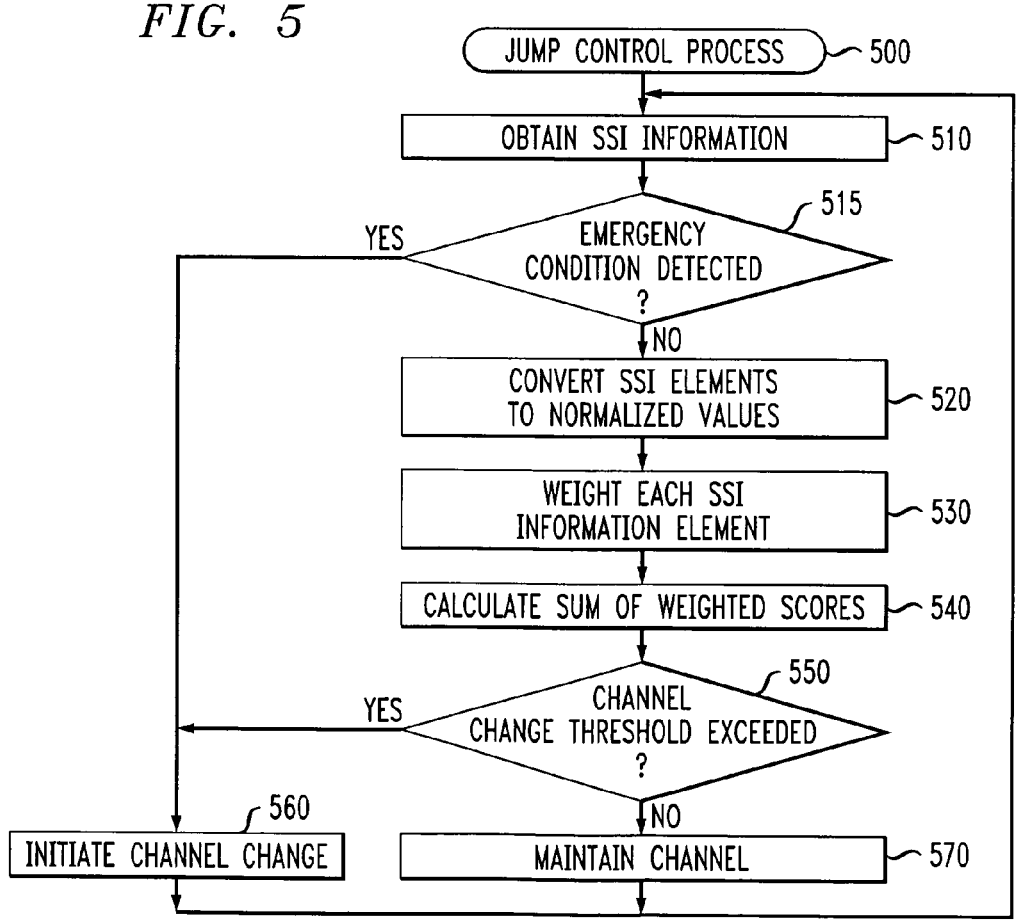
FIG. 4 is an exemplary table that records the exemplary measured and normalized values that have been collected for each channel by the channel selection process of FIG. 2.
FIG. 5 is a flow chart describing an exemplary jump control process that may be implemented by the jump control module of FIG. 1.

FIG. 4 is an exemplary table 400 that records the exemplary measured and normalized values that have been collected for each channel by the channel selection process 200 of FIG. 2. As shown in FIG. 4, the exemplary table 400 includes records for two exemplary channels 1, 2. For each channel, the table 400 records the measured and normalized values in fields 430 and 450, respectively, for the number of stations (s), noise level, n, and channel load, l. The symbol for each information element is indicated in field 420, where the first subscript indicates the channel number and the second subscript indicates the information element. Finally, the exemplary table 400 identifies a threshold in field 440 for the channel load, as discussed below.

The normalization performed during step 220 and recorded in field 450 can be any arbitrary procedure that re-scales the input values to values between 0 and 1, where '1' represents the desirable situation for the channel selection module 160. For example, a channel load of 0% would receive value '1' because it is the most desirable situation from the perspective of the channel selection module 160.

The channel selection process 200 of FIG. 2 calculates the sum of weighted scores for each channel for each of the normalized information values, as follows:

$$S_1 = 1 \times I_{1,s} + 3 \times I_{1,n} + 4 \times I_{1,l} = 1 \times 0.012 + 3 \times 0.2 + 4 \times 0.3 = 1.81$$

$$S_2 = 1 \times I_{2,s} + 3 \times I_{2,n} + 4 \times I_{2,l} = 1 \times 0.008 + 3 \times 0.4 + 4 \times 0.1 = 1.61$$

As $S_1$ is the highest score, the channel selection process 200 would select channel 1 as the preferred alternate operating channel during step 250. The currently selected operating channel is provided to the jump control module 180, as shown in FIG. 1 and discussed further below.

In an alternate implementation, the channel selection module 160 can assign priorities to each information element, and test (in the order of priority) whether the information element's value is greater than (or smaller than) a threshold, or if the current channel is better than any other channel by a certain amount (threshold), or if the information element is a boolean, then it can be a test on "true" or "false." If the threshold is exceeded or the test passes, then that channel is selected as the next operating channel. According to this alternate approach, the channel load is first evaluated. Assume that the required threshold for the channel load, l, is 20% (as shown in field 340 of table 300). If any channel has 20% load (i.e., an absolute number; not relative to any other channel) then that channel is selected. In the case of the exemplary two channels analyzed above, channel 1 has a 20% load, and channel 1 would be selected.

If the channel load threshold were set to 30% (and this threshold was not currently satisfied), then the information element with second priority (as identified in field 330) would be looked at, being the noise level. For the noise level information element, an absolute condition of greater than or equal to −80 is indicated in field 340 of the table 300. As the noise level is −80, this meets the required threshold and again channel 1 would be selected. The channel selection module 160 can examine any number of information elements that it needs to come to a proper decision.

It is noted that the implementation of FIG. 2, and the alternate implementation can be combined, for example, in a procedure that has as highest priority the presence of radar. In particular, a rule can be employed whereby if radar is present, then the channel is not suited for communication. Likewise, if radar is not present, then the calculated weighted sum is used as selection criterium.

In yet another variation, the channel selection module 160 can be in one or more slave devices 120, so that a slave device 120 that (temporarily) does not need to communicate can go to other radio channels to examine the channel conditions. A communications protocol (such as the IEEE 802.11k extensions for Radio Resource Measurements) would be required to specify how the slave device 120 communicates the selected channel to the master device 110.

System State Information Gathering

The system state information gathering module 170 gathers information about the current state of the local device 110 and the remote device 120. As the master device 110 is collecting all SSI information, a communications protocol is assumed for the slave devices 120 in the network to submit SSI information to the master device 110. As shown in FIG. 1, the slave device 120 provides SSI to the remote master device 110 over the wireless link 150. Specific information elements that can be gathered can differ greatly between communication systems, as would be apparent to a person of ordinary skill in the art, but can encompass any of the following:

average and/or peak buffer space consumed;
average and/or peak packet error rates or bit error rates;
average and/or peak buffer lag time (the difference between the time that data is properly received by the media sink device and the time that the data was captured at the media source device);
buffer underrun rate or event;
buffer overflow rate or event;
signal strength of other node's transmissions;
noise level on the current channel;
presence of identified interferers on the current channel (such as radars, other networks and microwaves);
other persistence measures of the above information elements; and
the characteristics of the 'best' channel, as determined by the channel selection module 160.

Of course, additional statistical information can be calculated, such as standard deviations, medians and minimums. The system state information gathering module 170 in the master device 110 collects the SSI information from the slave devices 120 and forwards all information, either collected locally or remotely, to the jump control module 180. The SSI information can generally be either given periodically, e.g., 10 times per second, but if any of the collected SSI information elements exceeds a predefined threshold then an immediate signal can be sent to the jump control module 180 to allow an immediate channel change to be executed.

Jump Control Module 180

As previously indicated, the jump control module 180 examines the collected system state information and determines when to select a new operating channel. The jump control module 180 uses a similar approach as the channel selection module 160 to distill the available information elements to the decision whether to jump or not.

FIG. 5 is a flow chart describing an exemplary jump control process 500, as implemented by the jump control module 180 of FIG. 1. As shown in FIG. 5, the jump control process 500 initially obtains, during step 510, the SSI information that is being processed, as discussed in the previous section. A test is performed on the obtained SSI information during step 515 to determine if an emergency condition is detected, requiring immediate action. For example, the presence of radar, a full transmit buffer on the transmit side (indicating that data is about to be lost) or another SSI condition may require immediate action. If an emergency condition is detected during step 515, the jump control process 500 immediately proceeds to step 560 to initiate a change of the operating channel.

If, however, an emergency condition is not detected during step 515, then the jump control process 500 converts the collected SSI information to normalized values for the current and alternate channel during step 520.

The jump control process 500 adds weights to each information element during step 530 to arrive at a weighted score for each information element and sums these weighted scores during step 540 to arrive at a final score for the current and alternate channel. The weights for each information element can be recorded in a table similar to the table 300 of FIG. 3. Finally, a test is performed during step 550 to determine if the threshold for switching channels has been exceeded. If it is determined during step 550 that the threshold is exceeded, then a channel change is initiated during step 560 by sending a signal to the jump signaling module 190, as discussed below. If, however, it is determined during step 550 that the threshold is exceeded, then the current channel is maintained during step 570. Program control returns to step 510 and continues in the manner described above. In this manner, the jump control process 500 can continuously evaluate whether or not to change the operating channel.

If, based on the SSI information, the jump control module 180 determines that the alternative channel indicated by the channel selection module 160 will provide a better operating environment than the current channel, then the jump control module 180 sends a signal to the jump signaling module 190 to initiate a signaling procedure to inform all other network nodes that a channel jump is being initiated.

Jump Signaling Module 190

The jump signaling module 190 is responsible for coordinating the transition to the new channel with the other nodes. The slave nodes 120 must know the selected new operating channel, and also when to change to the selected new operating channel. For example, the jump signaling module 190 can send a message to all slave devices to transition to the selected new operating channel '10 microseconds from now', or 'at time "t" according to a common clock' or any other time, depending on the timescale of events in the particular communications system. However, the transition should take place at a time as soon as possible, e.g., allowing some time for re-transmissions of signaling messages (such as the 'jump at time "t"' message) that were not properly received. Generally, the transition is made immediately to minimize the disruption of the communications service.

A communications protocol is assumed that defines the messages that need to be exchanged between the jump signaling module 190 and the slave devices 120 to make the selected new operating channel known to the other nodes. For example, in the IEEE 802.11h extensions (IEEE Std 802.11h/ D3.3.4, (Draft Supplement to IEEE Std 802.11, 1999 Edition), "Wireless MAC and PHY Specifications IEEE Spectrum and Transmit Power Management Extensions in the 5G Band in Europe") jump messages are defined. It should be noted, however, that these jump messages are broadcast a few times using beacon messages (which are, e.g., 100 ms from each other), and the jump takes place immediately after a beacon. It must be noted that this mechanism does not meet the specified objective of 'jumping as soon as possible' noted above. It may also be desirable that all nodes jump at approximately the same time to avoid loss of communication (i.e., if a group of nodes is on the original channel while some other nodes are already on the selected alternate channel, then no communication is possible between these groups). It is further noted that the 802.11h extension initiates such channel changes when radar is detected.

The slave devices 120 can be required to acknowledge the channel change message, to make sure that all slave devices 120 are aware of the channel change. The channel change messages can optionally be sent with a more reliable modulation if permitted by the communications protocol. For example, in the IEEE 802.11 protocol, different modulations with different robustness properties are defined. To ensure that all slave devices 120 properly receive the channel change message, a different modulation with a higher robustness can be used for this particular message. Also, mechanisms such as Forward Error Correction can be used to increase the probability that the message is received by the slave devices 120.

In a further variation, the master device 110 can optionally periodically broadcast the intended alternate channel (e.g., as part of the beacon messages in the IEEE 802.11 protocol, or using any other suitable communications protocol) to the slave devices 120. If a slave device 120 suddenly notices that all other devices are no longer on the channel, for example, if the slave device 120 has missed the channel change message, then the slave device 110 can go to the intended alternate channel to determine if the other devices have moved there.

Figure 6:
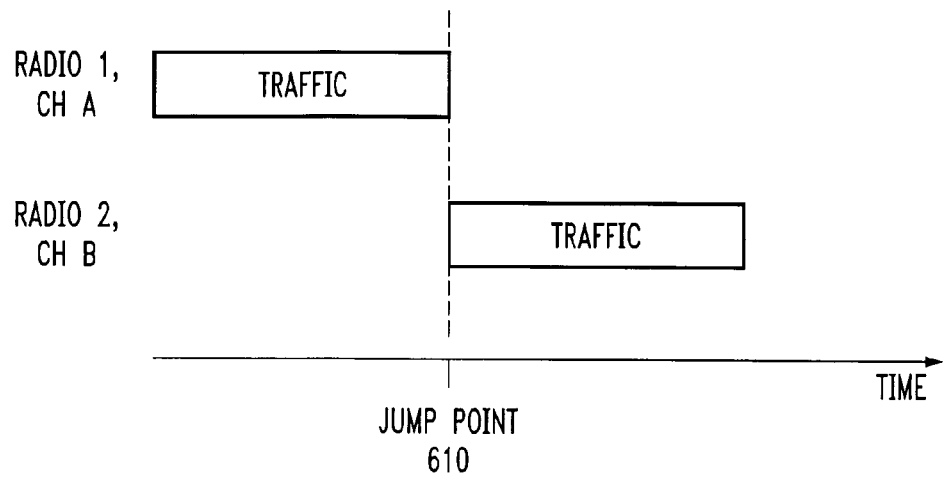
FIG. 6 illustrates an alternate implementation of the invention, where two radio devices are used in each device of FIG. 1, allowing two independent channels of communication.

FIG. 6 illustrates an alternate implementation of the present invention, where two radios are used in each device 110, 120, allowing two independent channels A, B of communication. As shown in FIG. 6, the slave devices 120 can reconfigure Radio 2 to the new selected operating channel, while Radio 1 is still actively participating in data communication. Only when contact on the new channel has been established, is communication transferred to Radio 2 at the jump point 610.

Figure 7:
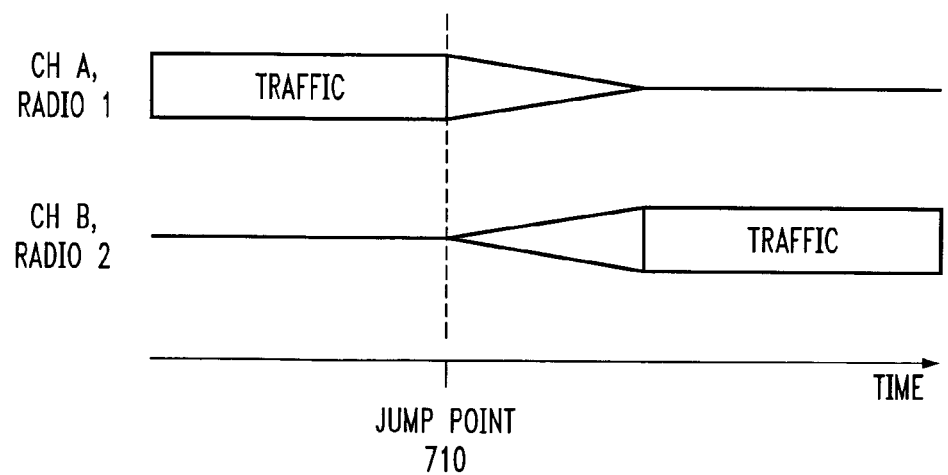
FIG. 7 illustrates a further alternate implementation of the invention, where the load is dynamically balanced over the two channels A, B of FIG. 6 during the transitional period.

FIG. 7 illustrates a further alternate implementation of the present invention, where the load is dynamically balanced over the two channels A, B during the transitional period (and possibly maintain this situation). Thus, traffic on the first channel A can gradually be transitioned over to the new selected operating channel B. As shown in FIG. 7, the grey area indicates the amount of traffic being sent on a channel. If two radios 1, 2 are used, then there will be no interruption in the data transport service, and the transition will not be perceivable to the user.

It is to be understood that the embodiments and variations shown and described herein are merely illustrative of the principles of this invention and that various modifications may be implemented by those skilled in the art without departing from the scope and spirit of the invention.

We claim:

1. A method for selecting an alternate channel in a wireless communications device, comprising the steps of:
    obtaining information about a plurality of available channels;
    assigning a score to each of said plurality of available channels, wherein said score is based on channel state information and system state information, wherein said system state information includes one or more of buffer state information and error information;
    selecting an alternate channel from said plurality of available channels based on said score.

2. The method of claim 1, wherein said score is based on at least one normalized information item.

3. The method of claim 1, wherein said score is based on at least one weighted information item.

4. The method of claim 1, wherein said obtained information includes a number of other devices on each available channel.

5. The method of claim 1, wherein said obtained information includes a noise level on each available channel.

6. The method of claim 1, wherein said obtained information includes a channel load on each available channel.

7. The method of claim 1, further comprising the step of comparing said selected alternate channel to a currently selected channel.

8. The method of claim 7, wherein said comparison is based on system state information obtained for said selected alternate channel to a currently selected channel.

9. The method of claim 7, further comprising the step of initiating a change to said selected alternate channel if a predefined criteria is satisfied.

10. The method of claim 9, further comprising the step of sending a message to at least one slave device to notify said slave device of said selected alternate channel.

11. The method of claim 1, wherein said selecting step is further based on one or more thresholds that specify a value that should initiate a change of an operating channel based on said score.

12. The method of claim 1, wherein said selecting step is further based on one or more priorities that rank one or more information elements that contribute to said score.

13. The method of claim 1, further comprising the step of immediately initiating a change to said selected alternate channel if a predefined emergency condition is detected.

14. The method of claim 1, wherein one or more of weights, priorities and thresholds used by said method are stored in a table.

15. The method of claim 14, wherein one or more of said weights, priorities and thresholds in said table are modified to adjust said selection method.

16. A wireless communication device, comprising:
    a channel selection module to select an alternate channel from a plurality of available channels based on a score for each of said plurality of available channels, said score based on information obtained about each of said plurality of available channels, channel state information and system state information, wherein said system state information includes one or more of buffer state information and error information.

17. The wireless communication device of claim 16, further comprising a jump control module to compare said selected alternate channel to a currently selected channel.

18. The wireless communication device of claim 17, wherein said jump control module is further configured to initiate a change to said selected alternate channel if a predefined criteria is satisfied.

19. The wireless communication device of claim 18, wherein said jump control module is further configured to initiate transmission of a message to at least one slave device to notify said slave device of said selected alternate channel.

20. The wireless communication device of claim 17, wherein said jump control module is further configured to immediately initiate a change to said selected alternate channel if a predefined emergency condition is detected.

21. The wireless communication device of claim 16, further comprising a table for recording one or more of weights, priorities and thresholds used by said wireless communication device.

22. The wireless communication device of claim 21, wherein one or more of said weights, priorities and thresholds in said table are modified to adjust selection criteria for said channel.

23. The wireless communication device of claim 16, wherein said device is implemented in accordance with the IEEE 802.11 Standard.

24. The wireless communication device of claim 16, wherein said device is implemented in accordance with the HIPERLAN/2 Standard.

25. A wireless communication device, comprising:
a channel selection module to select an alternate channel from a plurality of available channels based on a score for each of said plurality of available channels, said score based on information obtained about each of said plurality of available channels, channel state information and system state information, wherein said system state information includes one or more of buffer state information and error information; and
a jump control module to initiate a change to said selected alternate channel if a predefined criteria is satisfied.

26. The wireless communication device of claim 25, wherein said jump control module is further configured to initiate transmission of a message to at least one slave device to notify said slave device of said selected alternate channel.

27. The wireless communication device of claim 25, wherein said jump control module is further configured to immediately initiate a change to said selected alternate channel if a predefined emergency condition is detected.

* * * * *